US011207875B2

(12) United States Patent
Dassonville et al.

(10) Patent No.: US 11,207,875 B2
(45) Date of Patent: Dec. 28, 2021

(54) ENAMEL PRINTING PROCESS FOR A LAMINATED GLAZING HAVING FUNCTIONAL LAYERS

(71) Applicant: SAINT-GOBAIN GLASS FRANCE, Courbevoie (FR)

(72) Inventors: Camille Dassonville, Compiegne (FR); Dieter Kleyer, Würselen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 152 days.

(21) Appl. No.: 16/096,934

(22) PCT Filed: Apr. 20, 2017

(86) PCT No.: PCT/FR2017/050938
§ 371 (c)(1),
(2) Date: Oct. 26, 2018

(87) PCT Pub. No.: WO2017/187054
PCT Pub. Date: Nov. 2, 2017

(65) Prior Publication Data
US 2019/0091972 A1 Mar. 28, 2019

(30) Foreign Application Priority Data
Apr. 27, 2016 (FR) ...................... 1653735

(51) Int. Cl.
B32B 17/10 (2006.01)
B32B 37/18 (2006.01)
(Continued)

(52) U.S. Cl.
CPC ...... *B32B 37/182* (2013.01); *B32B 17/10036* (2013.01); *B32B 17/10174* (2013.01);
(Continued)

(58) Field of Classification Search
CPC ........ C03C 2218/365; B32B 17/10036; B32B 37/182
See application file for complete search history.

(56) References Cited

U.S. PATENT DOCUMENTS 4,954,153 A 9/1990 Coleman et al.
4,959,090 A 9/1990 Reinherz
(Continued)

FOREIGN PATENT DOCUMENTS

EP 0 106 628 A1 4/1984
EP 0 652 053 A2 5/1995
(Continued)

OTHER PUBLICATIONS

International Search Report as issued in International Patent Application No. PCT/FR2017/050938, dated Jul. 28, 2017.
(Continued)

*Primary Examiner* — Philip C Tucker
*Assistant Examiner* — John Blades
(74) *Attorney, Agent, or Firm* — Pillsbury Winthrop Shaw Pittman LLP

(57) ABSTRACT

A process for the printing of enamel on a constituent glass sheet of a laminated glazing which can be used in the motor vehicle field and including a stack of thin functional layers sensitive to scratchability. The process makes it possible to deposit an enamel layer on a glass sheet coated with a stack of thin layers.

6 Claims, 1 Drawing Sheet

Figure 1:
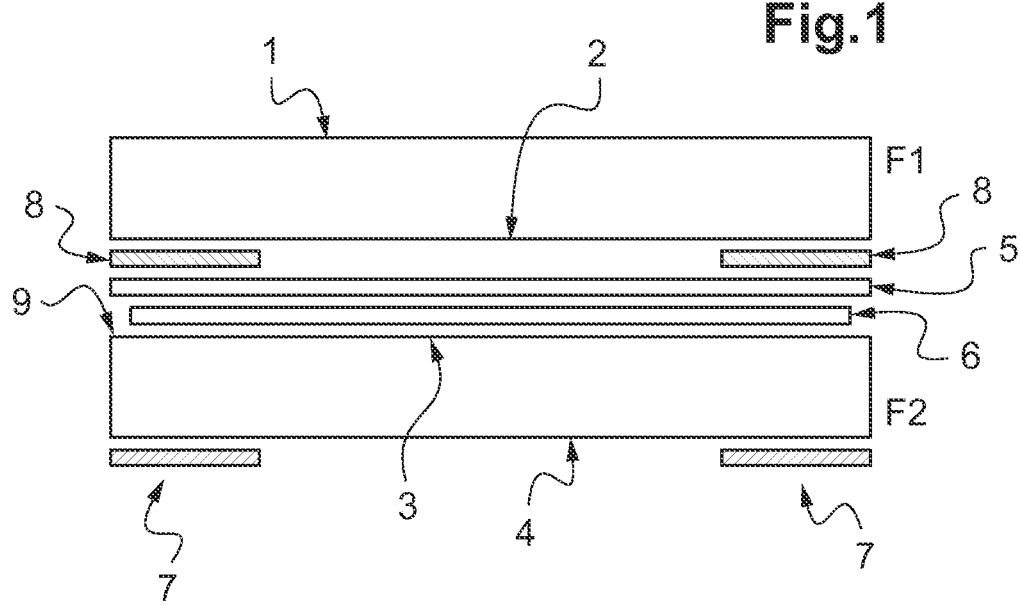

(51) Int. Cl.
*C03C 17/00* (2006.01)
*C03C 17/02* (2006.01)
*C03C 17/36* (2006.01)
*B60J 1/00* (2006.01)
*B62D 25/06* (2006.01)

(52) U.S. Cl.
CPC ......... *B32B 17/10348* (2013.01); *B60J 1/001* (2013.01); *B62D 25/06* (2013.01); *C03C 17/002* (2013.01); *C03C 17/02* (2013.01); *C03C 17/366* (2013.01); *C03C 2218/365* (2013.01)

(56) References Cited

U.S. PATENT DOCUMENTS

| | | |
|---|---|---|
| 5,108,479 A | 4/1992 | Hirano |
| 5,431,966 A | 7/1995 | Daude et al. |
| 5,639,517 A * | 6/1997 | Floch ............... B05D 1/26 427/5 |
| 6,103,011 A * | 8/2000 | Riera ............... B05C 1/027 118/264 |
| 6,336,723 B1 | 1/2002 | Nicolin |
| 6,598,426 B2 | 7/2003 | Vandal et al. |
| 2003/0150848 A1 | 8/2003 | Noguchi et al. |
| 2003/0232197 A1* | 12/2003 | Disteldorf ......... C03C 17/36 428/411.1 |
| 2006/0260734 A1 | 11/2006 | Brown et al. |
| 2007/0199349 A1* | 8/2007 | Lucca ............. B32B 17/10935 65/59.1 |
| 2010/0220019 A1 | 9/2010 | Boote |
| 2010/0252544 A1 | 10/2010 | Marquet |
| 2010/0310778 A1 | 12/2010 | Shioi et al. |
| 2015/0210872 A1* | 7/2015 | Wery ................ B41M 1/30 428/207 |
| 2016/0185656 A1* | 6/2016 | Danneels ............ C03C 8/14 428/210 |

FOREIGN PATENT DOCUMENTS

| | | |
|---|---|---|
| EP | 1 710 104 A2 | 10/2006 |
| JP | S59-028526 U | 2/1984 |
| JP | H07-31910 A | 2/1995 |
| JP | H07-185430 A | 7/1995 |
| JP | 2001-048602 A | 2/2001 |
| JP | 2008-057274 A | 3/2008 |
| JP | 2011-505311 A | 2/2011 |
| JP | 2015-520721 A | 7/2015 |
| WO | WO 03/080528 A1 | 10/2003 |
| WO | WO 2005/073140 A1 | 8/2005 |
| WO | WO 2007/080186 A1 | 7/2007 |
| WO | WO 2013/163238 A | 10/2013 |
| WO | WO 2013/189798 A1 | 12/2013 |
| WO | WO 2014/020261 * | 2/2014 ............. B41M 1/12 |
| WO | WO 2014/174308 A1 | 10/2014 |
| WO | WO 2015/009377 A1 | 1/2015 |

OTHER PUBLICATIONS

Communication of a Notice of Opposition—First Information to Patent Proprietor & Brief Communication—Opposition Proceedings as issued in European Patent Application No. 17725296.2, dated Dec. 10, 2020.

Notice of Reasons for Refusal as issued in Japanese Patent Application No. 2018-556322, dated Dec. 22, 2020.

* cited by examiner

ENAMEL PRINTING PROCESS FOR A LAMINATED GLAZING HAVING FUNCTIONAL LAYERS

CROSS-REFERENCE TO RELATED APPLICATIONS

This application is the U.S. National Stage of PCT/FR2017/050938, filed Apr. 20, 2017, which in turn claims priority to French patent application number 1653735 filed Apr. 27, 2016. The content of these applications are incorporated herein by reference in their entireties.

The present invention relates to a process for the printing of enamel on a constituent glass sheet of a laminated glazing comprising a stack of thin functional layers sensitive to scratchability, which can be used in particular as in the motor vehicle field.

Motor vehicle glazings, in particular used as windshield, are laminated glazings consisting of two glass sheets combined with an interlayer sheet made of thermoplastic polymer placed between the two glass sheets. Each glass sheet thus has a face turned toward said interlayer sheet. Conventionally, for a glazing fitted in a motor vehicle, reference is made to faces 1 to 4 of a laminated glazing using the following conventions. The glass sheet in contact with the exterior of the vehicle, also sometimes known as first glass sheet, has a face 1 and a face 2. The face 1 is that located toward the exterior, while the face 2 is that turned toward the interlayer sheet. The other glass sheet, or also second glass sheet, is in contact with the interior of the vehicle and has a face 3 and a face 4. The face 3 is that turned toward the interlayer sheet while the face 4 is that directed toward the interior.

Motor vehicle glazings very often have opaque enamel strips which have a twofold role: they make it possible both to preserve the integrity of adhesive located under the glazing when the latter is fitted by adhesive bonding in the bodywork opening with regard to solar radiation and particularly ultraviolet rays and also to conceal the connection elements, for example of electrical type, which are located along the edges of the faces of the glazing. These strips may be peripheral or more central if they are, for example, intended to conceal the connector elements of rearview mirrors. These enamel strips are normally deposited on the glass sheets by screen printing processes.

Furthermore, many motor vehicle glazings are glazings functionalized in the sense that they make possible solar and/or thermal control, or also, for example, electromagnetic shearing. In order to obtain these functionalities in the glazings, one of the constituent glass sheets of the glazing is coated with a stack of several thin layers, some of which are functional metal layers, in particular based on silver, and others of which are layers made of dielectric material having very high very resistivities of the order of $10^8$ to $10^{16}$ Ω·m. These stacks are very often delicate in the sense that they can be easily scratched and damaged. When the coating is scratched, there is a risk of the metal layers being exposed and thus of constituting points of entry for corrosion problems. The stacks consequently have to be deposited on the faces regarded as internal and thus the least exposed of a laminated glazing, that is to say on the face 2 of the first glass sheet or the face 3 of the second glass sheet. During processes for the manufacture of such laminated glasses, when the stacks are sensitive to scratches, the enamel strip is deposited on the glass sheet which is not coated with the stack. Thus, if the stack of functional layers is positioned on the first glass sheet, the enamel strip will be applied to the second sheet, or vice versa. Generally, the stack is positioned on face 3 and the enamel strip is consequently on face 1 or 2. In this way, the peripheral enamel strip can be applied by normal screen printing techniques, without caring about any one coating since it is deposited on the uncoated sheet. In the majority of current functionalized motor vehicle glazings, the stack of layers is thus located on the face 3 and the enamel strip is on face 2, which makes it possible to conceal the demargining of the stack of layers. In point of fact, in this configuration, the plastic elements, such as rearview mirrors or supports for the rain detectors, are adhesively bonded to the face 4 and thus directly to the glass, that is to say to a relatively smooth surface, which may present difficulties at the time of the adhesive bonding. Some manufacturers try to avoid adhesively bonding these elements directly to the glass and would wish to be able to adhesively bond them to a strip made of enamel, which would thus facilitate the adhesive bonding while retaining the functionality of protection of the adhesive from UV radiation and of masking the connector elements. The present invention comes within this context and provides a process for the manufacture of a laminated glass in which the enamel strip is positioned on the glass sheet on which the stack of functional layers has been deposited. The process according to the invention advantageously makes it possible to obtain a laminated glazing in which the stack of functional layers is positioned on face 3 and the enamel strip is on face 4.

The process according to the present invention is a process for the manufacture of a laminated glass for a motor vehicle comprising at least a first glass sheet in contact with the exterior of the vehicle, a second glass sheet in contact with the interior of the vehicle and a thermoplastic interlayer positioned between the two glass sheets, at least one of said sheets being provided with a stack of thin layers comprising a plurality of functional layers sensitive to scratches, said process comprising the following stages:
  a. deposition of the stack of thin layers on one of the faces of the first or of the second glass sheet,
  b. positioning of the face coated with the stack of thin layers resting on a support,
  c. deposition of a liquid enamel, the composition of which has a viscosity of less than 10 Pa·s, on a zone of the uncoated face of the glass sheet used in stage a),
  d. heating the glass sheets for the bending or forming up to temperatures of between 500 and 650° C.,
  e. installing the thermoplastic interlayer between the first and second glass sheets,
  f. degassing the assembly under vacuum, then
  g. sealing and autoclaving the assembly.

Within the meaning of the present invention, the first glass sheet is that for which the face 1 is in contact with the exterior of the vehicle and the second glass sheet is in contact with the interior of the vehicle (passenger compartment side).

Preferably, the stack of thin functional layers is deposited on the face of the second glass sheet which will, after manufacture, be in contact with the thermoplastic interlayer. The stack is thus advantageously on face 3. Stage a) of the process is carried out by using the normal deposition techniques for the deposition of thin functional layers. Mention may be made of the magnetron cathode sputtering commonly used. Preferably, at least one of the thin layers of the stack is a silver layer.

Stage b) consists in positioning the glass sheet coated with the stack of thin layers resting on a support so that the face in contact with the support is the face on which the deposition of the stack of thin functional layers was carried out during stage a). Advantageously, this support is a suction pad table which makes it possible to support the glass sheet without damaging the stack of thin scratch-sensitive layers. According to another embodiment, maintenance on the support can be carried out by an automated robot having support means of the suction pad type.

Stage c) of the process corresponds to the stage of deposition of the enamel on the same glass sheet as that on which the stack of thin functional layers has been deposited but on the face opposite that coated with the stack of thin layers. If the stack is advantageously on face 3, stage b) consists in depositing the enamel on face 4 of the second glass sheet. The deposition of the enamel is carried out by spraying or by curtain or roller coating. Preferably, the deposition of the enamel is carried out by coating with a brush, fed continuously with the enamel composition. The form, the size and the number of enamel layers which it is desired to deposit depend on the use for which the glazing is intended. Conventionally, the deposition is carried out on the circumference of the glazing in the form of a strip with a length which is variable but sufficient to conceal the elements located in the glazing, such as, for example, the electrical and/or heating connection means. The viscosity of the enamel composition which is deposited on the glazing has to be less than 10 Pa·s in order to be able to be applied by coating with a brush. This is because, if the viscosity is too high, the deposition technique used does not make it possible to obtain a homogeneous deposit. More preferably still, the viscosity of the enamel composition applied during stage c) is between 2 and 5 Pa·s. If the viscosity of the enamel composition is too low, for example less than 1 Pa·s, the product to be applied is too liquid and risks flowing during the transportation of the glazing between the different stages of the process.

Any type of enamel composition known for a motor vehicle application, generally black in color, can be used in the process according to the present invention provided that its viscosity is compatible with the deposition method used.

This stage c) of deposition of enamel is preferably carried out by at least one automated applicator robot, provided with at least one feed head of the brush type fed continuously with the enamel composition. In place of a brush, it is possible to equip the feed head with a felt or a foam also making it possible to carry out the deposition of the enamel. The applicator robot is also advantageously provided with means making it possible to keep the coated face resting on the support. It can thus be the same automated robot as that used in stage b) and having at least two different arms, one for the support and the other for the application of the enamel. Stage c) of deposition of enamel can also be carried out by one or more robots provided with at least two feed heads in order to carry out simultaneously the printing of the enamel over the whole of the glazing, each of the feed heads carrying out the deposition over a portion of the glazing. This configuration makes it possible in particular to use robots, the arms of which are smaller in size.

On conclusion of stage c), one of the glass sheets thus has, on one face, a stack of thin functional layers and, on the other face, an enamel strip.

The two constituent sheets of the glazing are subsequently subjected to a heating stage, in order to bend or form them, up to a temperature between 500° C. and 650° C. This temperature corresponds to the softening point of the glass sheet, which can then be curved.

The glass sheets, once bent, can thus be directly assembled, without it being necessary to carry out a specific stage of drying and of precuring of the enamel deposited on the glass sheet having the stack of thin functional layers. The drying and the curing are thus directly carried out during the stage of bending the laminated glazing.

Stages e) to g) of the process according to the invention correspond to the normal stages of assembling a laminated glass. The two glass sheets are positioned so that the thermoplastic interlayer is placed between the two glass sheets. The face of the glass sheet or sheets which comprises the stack of thin layers is that turned toward the thermoplastic interlayer (face 2 and/or face 3). The assembly is degassed under vacuum before being sealed and autoclaved. The degassing takes place, for example, by placing the assembly of the laminated glazing inside a silicone envelope, inside which the air is discharged by a vacuum pump. During stage g), the assembly placed in the vacuum bag is heated to a temperature of approximately 80° C. and then the final adhesion of the assembly takes place during the autoclaving phase. The glazing, extracted from the vacuum bag, is subjected, for example, to a cycle of hydrostatic pressure of 12 bar and of temperature at 135° C., for a period of time of approximately 90 minutes, in order to remove all of the remaining air.

The present invention also relates to a laminated glazing comprising at least two glass sheets and a thermoplastic interlayer capable of being obtained by the process described above. The glazing according to the invention comprises a stack of scratch-sensitive functional layers positioned on the face turned toward the thermoplastic interlayer of at least one of the glass sheets and at least one enamel strip on the other face of the same glass sheet. Thus, on using the terminology defined above, the coating is on face 3 and the enamel on face 4. The elements possibly necessary for the connections of the thin functional layers, for example the collector strips, also known as busbars, are also positioned on the face 3 of the glazing. The glazing according to the present invention is such that it becomes possible to carry out the adhesive bonding of elements occurring inside the passenger compartment of the vehicle directly on the enamel which occurs on the face turned toward the interior (face 4).

The thermoplastic interlayer can, for example, be a film made of polyvinyl butyral, of polyurethane, of ethylene/vinyl acetate copolymer, of polyvinyl chloride, of silicone or of resin.

The stack of thin functional layers can give the glazing antireflection, semireflective, conductive and/or solar control properties, and the like.

The glazing according to the present invention can also comprise an enamel strip on the face of the glass sheet which does not comprise the stack of thin functional layers and which is turned toward the thermoplastic interlayer. Thus, the face 2 of the glazing can comprise an enamel strip intended to hide the demargining of the stack of thin layers. This enamel strip can be deposited by spraying or by curtain or roller coating.

The figures below illustrate the invention without limiting the scope thereof.

FIG. 1 is a view in cross section of a glazing according to the present invention. This glazing comprises two glass sheets F1 and F2. The sheet F1 has a first face (1) intended to be turned toward the exterior of the vehicle and a second face (2) turned toward the thermoplastic interlayer (5). The second sheet F2 has a face (3) turned toward the thermoplastic interlayer (5) and a face (4) intended to be turned toward the interior of the passenger compartment of the vehicle. The stack of thin functional layers represented by the reference (6) is positioned on the face (3) of the glazing.

The process according to the invention makes it possible to deposit an enamel strip, in the present case a peripheral enamel strip, represented by the reference (7) on the face (4) of the sheet F2. In the glazing represented in FIG. 1, another enamel strip (8) has been deposited at the periphery of the face (2) of the glass sheet (F1) in order to hide the demargining zones (9) located along the edge of the stack of thin layers.

Figure 2:
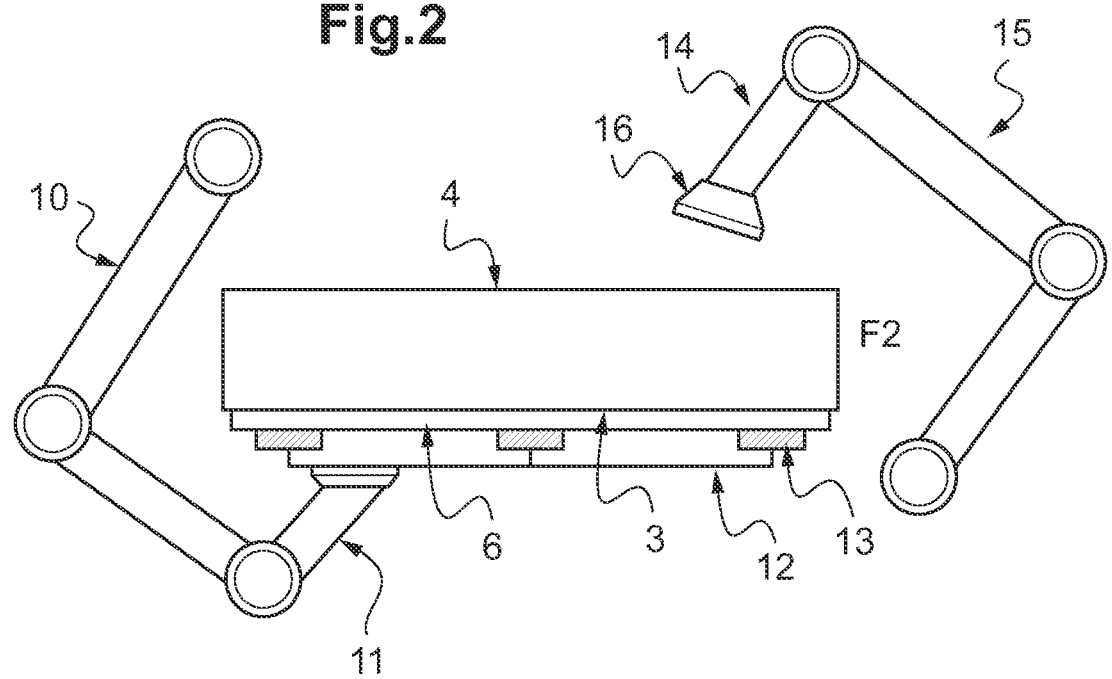

FIG. 2 represents an embodiment of the process according to the invention. The glass sheet F2 comprising the stack of thin functional layers (6) deposited on the face (3) is held resting by an arm (11) of the robot (10) making it possible to support the glass sheet F2 via a support (12) equipped with suction pads (13). An arm (14) of an applicator robot (15) is equipped with an application head (16) fed continuously with the enamel composition to be deposited on the face (4).

The invention claimed is:

1. A process for the manufacture of a laminated glass for a motor vehicle comprising at least a first glass sheet in contact with an exterior of the motor vehicle, a second glass sheet in contact with an interior of the motor vehicle and a thermoplastic interlayer positioned between the first and second glass sheets, at least one of said first and second glass sheets being provided with a stack of thin layers comprising a plurality of functional layers sensitive to scratches, said process comprising the following stages carried out in the following order:
    a. depositing the stack of thin layers on a face of the first or of the second glass sheet;
    b. positioning of the face coated with the stack of thin layers resting on a support so that the stack of thin layers is in contact with the support;
    c. depositing, by spraying or brushing, a liquid enamel on a zone of an uncoated face of the first or the second glass sheet used in stage a), said liquid enamel having a composition that has a viscosity of less than 10 Pa . s, said liquid enamel extending up to a peripheral edge of said first or second glass sheet used in stage a);
    d. bending the first and second glass sheets by heating the first and second glass sheets to temperatures of between 500 and 650° C., wherein no stage of drying and of precuring is carried out before stage d), wherein said liquid enamel is dried and cured during said stage d) of bending;
    e. installing the thermoplastic interlayer between the first and second glass sheets to form an assembly of the first and second glass sheets and the thermoplastic interlayer, so that the face coated with the stack of thin layers is turned toward said thermoplastic interlayer;
    f. degassing the assembly under vacuum, then
    g. sealing and autoclaving the assembly.

2. The process as claimed in claim 1, wherein stage c) is carried out by at least one automated applicator robot provided with at least one feed head equipped with a brush and fed continuously with the enamel composition.

3. The process as claimed in claim 2, wherein said automated applicator robot is also provided with means adapted to keep the coated face resting on the support.

4. The process as claimed in claim 1, wherein stage c) is carried out by one or more robots provided with at least two feed heads in order to carry out simultaneously a printing of the enamel over the whole of a glazing formed by said laminated glass, each of the feed heads carrying out the deposition over a portion of the glazing.

5. The process as claimed in claim 1, wherein the enamel deposited in stage c) is a liquid composition, a viscosity of which is between 2 and 5 Pa . s.

6. The process as claimed in claim 1, wherein the stack of thin functional layers deposited in stage a) comprises at least one silver layer.

* * * * *